US010637679B2

(12) United States Patent
Jin et al.

(10) Patent No.: US 10,637,679 B2
(45) Date of Patent: Apr. 28, 2020

(54) SMART HOME SCENE SWITCHING METHOD AND SYSTEM (71) Applicant: Zhuhai Unitech Power Technology Co., Ltd., Guangdong (CN)

(72) Inventors: Shuqiang Jin, Guangdong (CN); Yongqiang Zhang, Guangdong (CN); Jiamin Wang, Guangdong (CN)

(73) Assignee: ZHUHAI UNILINK TECHNOLOGY CO., LTD., Zhuhai, Guangdon (CN)

( * ) Notice: Subject to any disclaimer, the term of this patent is extended or adjusted under 35 U.S.C. 154(b) by 700 days.

(21) Appl. No.: 15/035,913

(22) PCT Filed: Oct. 29, 2014

(86) PCT No.: PCT/CN2014/089804
§ 371 (c)(1),
(2) Date: May 11, 2016

(87) PCT Pub. No.: WO2015/070708
PCT Pub. Date: May 21, 2015

(65) Prior Publication Data
US 2016/0277203 A1  Sep. 22, 2016

(30) Foreign Application Priority Data
Nov. 12, 2013 (CN) .......................... 2013 1 0558587

(51) Int. Cl.
*H04L 12/28* (2006.01)
*G05B 15/02* (2006.01)
*G06N 5/02* (2006.01)

(52) U.S. Cl.
CPC ............ *H04L 12/282* (2013.01); *G05B 15/02* (2013.01); *G06N 5/02* (2013.01); *G05B 2219/2642* (2013.01)

(58) Field of Classification Search
CPC ........ H04L 12/282; G06N 5/02; G05B 11/01; G05B 13/02; G05B 15/02; G05B 19/042;
(Continued)

(56) References Cited

U.S. PATENT DOCUMENTS 8,490,006 B1   7/2013 Reeser et al.
9,349,217 B1 * 5/2016 Worley, III .......... G06T 19/003
(Continued)

FOREIGN PATENT DOCUMENTS

CN   101776907 A   7/2010
CN   101833286 A   9/2010
(Continued)

OTHER PUBLICATIONS

English language abstract and machine translation for JP2005130423 (A) extracted from http://worldwide.espacenet.com database on Sep. 13, 2017, 37 pages.
(Continued)

Primary Examiner — David Lam
(74) Attorney, Agent, or Firm — Warner Norcross + Judd LLP (57) ABSTRACT A smart home scene switching method and system are disclosed. In the method and system, a priority order of several scenes is calculated dynamically according to status parameters of a current scene and/or historical record of past scenes, and scenes are sequentially switched according to the priority order, based on an event causing scene change and a switching rule between the event and the scene. The smart home scene switching method and system expand switching and selecting of smart home scenes. The scenes are switched according to the priority order, thus simplifying user's switching and selecting operation on scenes and
(Continued)

further improving the efficiency of switching scenes, which improves the reliability and stability of smart home scene switching.

15 Claims, 3 Drawing Sheets

(58) Field of Classification Search
CPC .................. G05B 2219/2642; G06F 3/017; H04N 7/142; H04N 7/15
See application file for complete search history.

(56) References Cited

U.S. PATENT DOCUMENTS

| | | | |
|---|---|---|---|
| 9,922,580 B2 * | 3/2018 | Mathews | G09B 25/00 |
| 2007/0116013 A1 | 5/2007 | Brown et al. | |
| 2008/0198571 A1 * | 8/2008 | Huang | G02B 6/0043 362/23.03 |
| 2008/0298571 A1 * | 12/2008 | Kurtz | H04N 7/142 379/156 |
| 2008/0309513 A1 | 12/2008 | Ebbe et al. | |
| 2012/0329439 A1 | 12/2012 | Ge | |
| 2013/0231991 A1 | 9/2013 | Denari | |

FOREIGN PATENT DOCUMENTS

| | | |
|---|---|---|
| CN | 101887342 A | 11/2010 |
| CN | 102355392 A | 2/2012 |
| CN | 102436246 A | 5/2012 |
| CN | 102529979 A | 7/2012 |
| CN | 103139652 A | 6/2013 |
| CN | 103345232 A | 10/2013 |
| JP | 2005130423 A | 5/2005 |
| JP | 2006352805 A | 12/2006 |
| JP | 2008140176 A | 6/2008 |
| JP | 2011158186 A | 8/2011 |
| JP | 2012010062 A | 1/2012 |
| JP | 2012175377 A | 9/2012 |

OTHER PUBLICATIONS

English language abstract and machine translation for JP2006352805 (A) extracted from http://worldwide.espacenet.com database on Sep. 13, 2017, 33 pages.
English language abstract and machine translation for JP2008140176 (A) extracted from http://worldwide.espacenet.com database on Sep. 13, 2017, 34 pages.
English language abstract and machine translation for JP2011158186 (A) extracted from http://worldwide.espacenet.com database on Sep. 13, 2017, 21 pages.
English language abstract and machine translation for JP2012175377 (A) extracted from http://worldwide.espacenet.com database on Sep. 13, 2017, 22 pages.
PCT/CN2014/089804 International Search Report dated Jan. 21, 2015, 2 pages.
English language abstract and machine translation for CN101776907 (A) extracted from http://worldwide.espacenet.com database on May 10, 2016, 20 pages.
English language abstract and machine translation for CN101833286 (A) extracted from http://worldwide.espacenet.com database on May 10, 2016, 13 pages.
English language abstract and machine translation for CN101887342 (A) extracted from http://worldwide.espacenet.com database on May 23, 2016, 18 pages.
English language abstract and machine translation for CN102355392 (A) extracted from http://worldwide.espacenet.com database on May 10, 2016, 14 pages.
English language abstract and machine translation for CN102436246 (A) extracted from http://worldwide.espacenet.com database on May 23, 2016, 8 pages.
English language abstract and machine translation for CN102529979 (A) extracted from http://worldwide.espacenet.com database on May 10, 2016, 25 pages.
English language abstract and machine translation for CN103139652 (A) extracted from http://worldwide.espacenet.com database on May 10, 2016, 12 pages.
English language abstract and machine translation for CN103345232 (A) extracted from http://worldwide.espacenet.com database on May 23, 2016, 22 pages.
English language abstract and machine translation for JP2012010062 (A) extracted from ThomsonReuters database on May 29, 2017, 29 pages.

* cited by examiner

SMART HOME SCENE SWITCHING METHOD AND SYSTEM

CROSS-REFERENCE TO RELATED APPLICATIONS

This application is the National Stage of International Application No. PCT/CN2014/089804, filed on 29 Oct. 2014, which claims priority to and all advantages of Chinese Patent Application No. 201310558587.3, filed on 12 Nov. 2013, the content of which is hereby incorporated by reference.

FIELD OF THE INVENTION

The present invention relates to the technical field of smart home control, in particular, to a smart home scene switching method and system.

BACKGROUND

A scene comprises occasion and environment, i.e., an environment on a certain occasion. The scene control of smart home refers to a control over light, background music and other smart home devices performed as specifically required for a certain occasion so that users can obtain the best effect experience.

For example, scene 1: at the time of getting up in the morning, there is ringing sound of a bell or music reminder in the bedroom, accompanied by the withdrawal of curtain and a gradual illumination of illuminating lights as required; scene 2: at the time of having meal, there is bright lights in the dinning room and background music that promotes appetite; scene 3: before going to sleep at night, the curtain is drawn automatically and the illuminating lights are turned off gradually, accompanied by soft music that promotes getting asleep; and scene 4: when there is no people at home, all the illuminating lights and background music are turned off and a security system is activated.

Typically, a scene switching of smart home can be conducted by a control center so as to achieve a coordinative control of all the home appliances in the home. Also, a control strategy can be directly integrated into certain home appliance(s) in the home so as to directly achieve the control of scene switching. For example, the following three technologies in the prior art present relevant patent documents of smart home scene control.

(1) CN patent application No. 201110239578.9 discloses a client end and a control system thereof for smart home control, which is used for entering control instructions through network, achieving remote control of smart home, and solving the problem of remotely switching and controlling smart home devices. In the technical solution of this patent, a remote control of home devices is realized, and no analysis is conducted based on the current scene or past scene of the smart home; rather, an operation is performed only according to a control instruction from the user, and it is required for the user to provide a specific control operation solution, thus resulting in a low efficiency in home scene switching;

(2) CN patent application No. 201110425089.2 discloses a smart home centralized control apparatus having an environment adaptive situation mode, wherein an environment sensing device is provided, and various parameters in the situation mode are adjusted according to the change of environment, thus dispensing with the trouble of manual adjustment by users. The controlled conditions in the scene switching method used in this technical solution are relatively simple. This is because at different locations and different times, the same temperature, humidity and light intensity or other environmental parameters will result in a great discrepancy in requirement for smart home scene.

(3) CN patent application No. 201210353944.8 discloses a scene self-studying type smart home system, wherein the inventive concept of the technical solution of this smart home system lies in acquiring user's preferred arrangement of scenes and adjusting home devices according to the preferred arrangement, thus simplifying user's switching operation on scenes. For variations in status parameters of the current scene, the home scenes are switched based on user's preference, and the influences on home devices by variations in status parameters are not taken into full consideration. The switched home scene may fail to meet expectation of the user, since user's preferred arrangement was determined only according to the past scene, and the variations in status parameters of the current scene are not taken into consideration.

As can be known from the above, there are several defects with existing smart home scene switching, comprising at least the following technical problems: if the user is not familiar with the scene mode of the home scene switching apparatus, the efficiency of switching and selecting scenes by the user would be low. In a designated environment, there is typically only one scene switching mode, and the scene that needs to be switched is predetermined, thus leading to a low possibility of the scene after switch meeting user's requirements. In some home scene switching systems, although the control parameters of the scene can be modified, the switching parameters of the original scene cannot be reserved, thus causing a loss of some control parameters of the scene and affecting subsequent scene switching and selecting.

SUMMARY OF THE INVENTION

In order to solve the above problems in the prior art, the invention aims to provide a smart home scene switching method and system, which expand switching and selecting of smart home scene, order and switch scenes according to priority so that the switching and selecting of scenes by the user are simplified and thus the efficiency of switching scenes is further improved; in addition, since the historical record of past scenes has not been changed, reliable data is provided for subsequent scene switching, thus ensuring the reliability and stability of smart home scene switching.

In an aspect, the invention provides a smart home scene switching method, comprising: dynamically calculating a priority order of a plurality of scenes according to status parameters of the current scene and/or historical record of past scenes; an event causing scene change comprises user's selecting operation on the scene and/or variation of status parameters of the current scene and a combined variation of status parameters at different time points; and sequentially switching scenes according to the priority order, based on the event and a switching rule between the event and the scene.

In the smart home scene switching method according to the invention, the switching rule between the event and the scene is an authorization table of the event and its corresponding scene; a scene corresponding to the event is determined according to the event and the switching rule between the event and the scene, and the scenes are switched according to the priority order.

The smart home scene switching method according to the invention comprises a plurality of scene groups, each scene group having a plurality of scenes; the priority order of the scenes in each scene group is dynamically calculated according to status parameters of the current scene and/or historical record of past scenes; the switching rule between the event and the scene is an authorization table of the event and its corresponding scene group; a scene group corresponding to the event is determined according to the event and the scene switching rule, and the scenes are switched according to the priority order.

In the smart home scene switching method according to the invention, the status parameters of the current scene comprise environment status parameters, time information, position information and operating statuses of home appliances. The environment status parameters comprise door latch status, temperature, humidity, personnel information and/or light intensity. The historical record of past scenes comprises the frequency at which the past scenes are used.

In another aspect, the invention further provides a smart home scene switching system, comprising a scene setting module, an event input module and a scene switching control center module, wherein the scene setting module is used for receiving scene information set by the user and for uploading it to the scene switching control center module, wherein the scene information comprises time information, status information and control target information; the event input module is used for acquiring status parameters of the current scene, generating an event causing scene change and transmitting it to the scene switching control center module; and the scene switching control center module is used for dynamically calculating a priority order of a plurality of scenes according to status parameters of the current scene and/or historical record of past scenes, and is also used for outputting scene information according to the priority order, based on the event causing scene change and a switching rule between the event and the scene.

The smart home scene switching system according to the invention further comprises a scene selecting module which is used for confirming scene information sent from the scene switching control center module.

The smart home scene switching system according to the invention further comprises a scene executing module which is used for adjusting operating statuses of home devices according to the scene information sent from the scene switching control center module, so that the home devices fit the target of scene control.

The smart home scene switching system according to the invention further comprises a scene alternative module which is used for checking and selecting alternative scenes that satisfy conditions, and for transmitting the confirmed alternative scenes to the scene switching control center module.

In the smart home scene switching system according to the invention, the status parameters of the current scene comprise environment status parameters, time information, position information and operating statuses of home appliances. The environment status parameters comprise door latch status, temperature, humidity, personnel information and/or light intensity. The historical record of past scenes comprises the frequency at which the past scenes are used.

The advantageous effects brought about by the invention are described as follows: with the smart home scene switching method and system according to the invention, several groups of scenes having a priority order are calculated dynamically according to the status parameters of the current scene and/or historical record of past scenes, thus expand switching and selecting of smart home scene; a group of scenes having a priority order are determined according to the event and the switching rule between the event and the scene, and the scenes are switched according to the priority order, thus simplifying user's switching and selecting operation on scenes and further improving the efficiency of switching scenes; in addition, in the invention, at the time of generating several groups of scenes having a priority order, the historical record of past scenes is not changed, thus providing reliable data for subsequent scene switching and further ensuring the reliability and stability of smart home scene switching.

BRIEF DESCRIPTION OF THE DRAWINGS

The accompanying drawings, which constitute a part of the invention, are presented so as to provide a further understanding of the invention. The schematic embodiments of the invention as well as a description thereof are used to explain the invention, and do not constitute an inappropriate limitation of the invention. In the drawings.

DETAILED DESCRIPTION OF THE INVENTION

The specific embodiments of the invention will be described below in detail with reference to the accompanying drawings. However, the invention can be carried out in many different ways defined and covered by the appended claims.

The invention provides a smart home scene switching method, comprising: dynamically calculating a priority order of a plurality of scenes according to status parameters of the current scene and/or historical record of past scenes; and sequentially switching scenes according to the priority order, based on an event causing scene change and a switching rule between the event and the scene.

wherein the event causing scene change comprises user's selecting operation on the scene, variation of status parameters of the current scene and/or a combined variation of status parameters at different time points. When at least one of the above events occurs, the scenes will be switched according to a corresponding switching rule, wherein the combined variation of status parameters at different time points is a virtual scene event which collects changes of status parameters at a plurality of different time points into a dynamic change in a time sequence. Such a dynamic change can be combined and recognized, thus causing scene switching.

Figure 1:
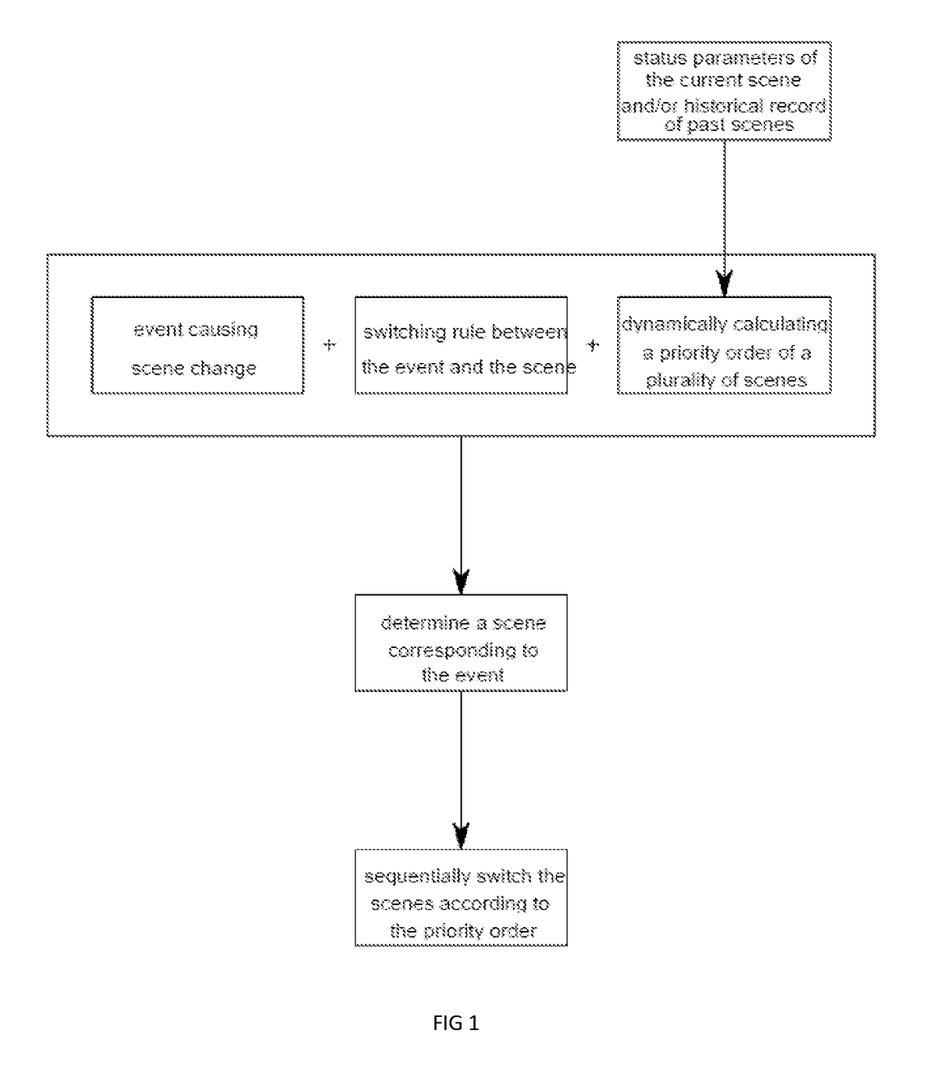
FIG. 1 is a schematic flowchart of the smart home scene switching method according to the invention.

As shown in FIG. 1, in an embodiment, the switching rule between the event and the scene is an authorization table of the event and its corresponding scene. In this embodiment, a scene corresponding to the event is determined according to the event and the switching rule between the event and the scene, and the scenes are switched according to the priority order.

Figure 2:
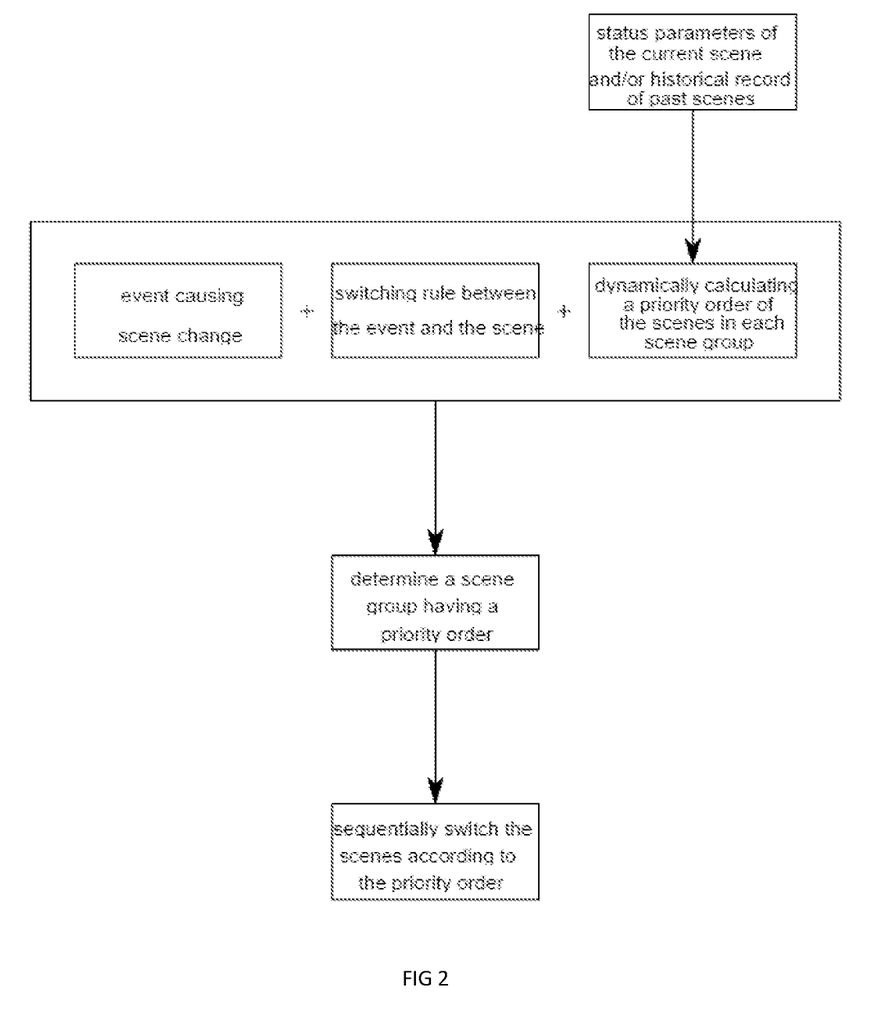
FIG. 2 is a schematic flowchart of the smart home scene switching method according to the invention.

As shown in FIG. 2, in another embodiment, the smart home scene switching method according to the invention comprises a plurality of scene groups, each scene group having a plurality of scenes, wherein the switching rule between the event and the scene is an authorization table of the event and its corresponding scene group.

In this embodiment, the smart home scene switching method specifically comprises: dynamically calculating a priority order of the scenes in each scene group according to status parameters of the current scene and/or historical record of past scenes; and determining a scene group corresponding to the event according to the switching rule between the event and the scene, and sequentially switching scenes according to the priority order.

Each event corresponds to a group of scenes having a priority order, and the switching rule between the event and the scene is an authorization table of the event and its corresponding group of scenes. For example, a corresponding scene is switched according to changes of status parameters, and a corresponding scene is switched according to user's operation. In addition, users can also customize the switching rule between the event and the scene. Specifically, users can customize the switching rule between the event and the scene by means of touch screen, switch or operation press key, or by way of communicative interaction via communication interfaces.

In this embodiment, during scene switching, a group of scenes are determined among several groups of scenes having a priority order according to the switching rule between the event and the scene, and scenes are sequentially switched according to the priority order of this group of scenes. Specifically, in an example of press key implementation, when the user presses the press key for the first time, a scene ranking 1 is shown; when the user presses the press key for the second time, a scene ranking 2 is shown; and when the user presses the press key for the third time, a scene ranking 3 is shown . . . and so on. In another embodiment, there are a plurality of press keys, wherein each press key respectively corresponds to a group of ordered scenes containing a plurality of sequentially ordered scenes, and the user can sequentially switch scenes that satisfy conditions through key pressing operations.

The status parameters of the current scene comprise environment status parameters, time information, position information and operating statuses of home appliances. The environment status parameters comprise door latch status, temperature, humidity, personnel information, light intensity, etc. The home appliances comprise home devices such as television, air conditioner, fan, digital photo frame, computer or the like. The historical record of past scenes comprises the frequency at which the past scenes are used. For example, historical records such as the frequencies at which different past scenes are used and user's preference for a certain scene and its frequency of use are applied to the calculation of the priority order of several scenes. Specifically, several scenes having a priority order are calculated according to the frequency at which the scene is used by user.

Figure 3:
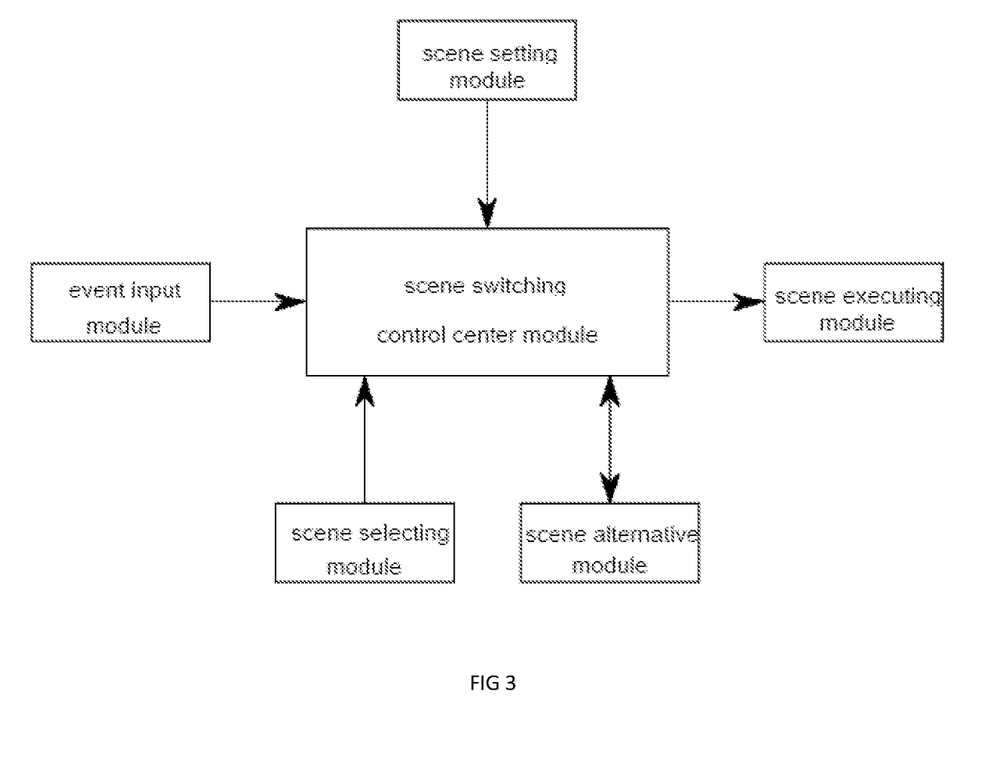
FIG. 3 is a schematic structure view showing the components of the smart home scene switching system according to the invention.

As shown in FIG. 3, the invention provides a smart home scene switching system, comprising a scene setting module, an event input module, a scene switching control center module, a scene selecting module, a scene executing module and a scene alternative module. The scene switching control center module achieves communication with other modules via a direct manner or indirect manner; the direct manner refers to data exchange via circuit connection; and the indirect manner refers to data exchange via a communicative way through communication interfaces. Different ways of communication can be selected as actually required so that the system communication is flexible and reliable.

The scene setting module is used for receiving the set scene information. The received scene information comprises time information, status information and control target information. The user can define the switching rule between the event and the scene through the scene setting module, and can also set the order of several scenes by himself. The setting of scenes can not only be added independently through the scene setting module, but also can be automatically generated through the change of status of a certain control target during the use of a certain scene. In an embodiment, the scene setting module comprises human-machine interactive interface and/or communication interface, wherein the human-machine interactive interface comprises screen, keyboard or touch screen.

The event input module is used for acquiring status parameters of the current scene, generating an event causing scene change and transmitting it to the scene switching control center module. In an embodiment, the event input module is a group of smart sensors or a plurality of separate smart sensors, which are used for collecting status information and sending it to the scene switching control center module. In another embodiment, the event input module is a communication interface which is used for reading status information from home devices and sending it to the scene switching control center module.

The scene switching control center module stores the frequencies at which the past scenes are used in different environmental conditions, dynamically calculates a priority order of a plurality of scenes according to status parameters of the current scene and historical record of past scenes, and orders the scenes according to the priority order. When an event such as user's operation or change of status parameter occurs, the switching of scenes will be triggered according to a corresponding rule. Moreover, the scene switching control center module is also used for receiving scene information confirmed by user through the scene selecting module, and outputting control target instruction to the scene executing module according to the control target set by the scene. The scene switching control center module dynamically adjusts the priority of the ordering of scenes according to the historical record of past scenes, simplifies the ways how users select scenes, significantly improves the efficiency in scene selecting, and can provide several groups of scenes at the same time for user's selection at designated conditions, thus meeting user's diverse requirements. The historical record of past scenes, as a basis for scene ordering, improves the efficiency of selecting designated scene by user. (e.g., a scene that is often selected by user).

By calculation, the scene switching control center module generates several dynamic scenes. With different status parameters of the current scenes or different historical records of past scenes, the dynamically calculated scene orders are also different, wherein several scenes can be defined in advance by user through the system, or can be dynamically calculated and generated again by the system according to status parameters of the current scene and/or historical record of past scenes.

When the scene switching control center module orders the scenes according to the historical record of past scenes, the ordering priority of scenes can be dynamically adjusted according to the frequency at which the past scenes were used by the user in this environmental condition, thus increasing the probability that the scene appears in this environment for the next time.

The status parameters of scene comprise environment parameters such as door latch status, temperature, humidity, personnel information, light intensity, etc, and also operating statuses of home devices such as television, air conditioner, fan, digital photo frame, computer or the like. In addition, the time information and the position information are also scene status parameters, wherein the time information can be acquired by a calculation performed by a clock chip of the scene switching control center module, or can be inquired and received via communication interface. More scene status parameters with more details will make the scene switching effect more accurate and closer to user's practical requirements.

The event causing scene change comprises user's selecting operation on the scene, variation of status parameters of the current scene and/or a combined variation of status parameters at different time points. When at least one of the above events occurs, the scenes will be switched according to a corresponding switching rule.

The combined variation of status parameters at different time points is a virtual scene event which collects changes of status parameters at a plurality of different time points into a dynamic change in a time sequence. Such a dynamic change can be combined and recognized, thus causing scene switching.

In a particular embodiment, the scene switching control center module can be provided in a smart switch and can be used for controlling the scene of a certain designated position; or can be applied to a smart home control center and can be used for controlling the scenes of all the positions in the whole home environment; or can be applied to application programs of a computer or a mobile terminal such as cell-phone and tablet computer, and can be used for controlling the scene of a certain designated poison or all the positions in the home environment. Moreover, the scene switching control center module can be also implemented by means of an embedded processor and software running thereon.

The scene selecting module is used for confirming scene information sent from the scene switching control center module. In a particular embodiment, the scene selecting module can be a switch or a press key, and the scene information is selected and confirmed by a single click or a double click operation. The scene selecting module can be also a human-machine interactive terminal (e.g., computer or mobile terminal) which is used for acquiring scene confirmation information. The user confirms scene information through the scene selecting module. For realizing a desired scene, if a single click does not result in the desired scene, the user can select and switch scenes by consecutive operations. When a certain scene can be output only after the user performs many times of consecutive operations and the scene is in practical use by the user, the scene switching control center module can make a determination automatically and orders this scene in front, according to user's use record and status information. After the user confirms the desired scene through the scene selecting module, if the press key is not operated within a time period (e.g., 10 seconds), the press key is pressed after the time period elapses, and the scene switching control center module determines to close this scene, thus simplifying user's operation.

The scene executing module adjusts the operating statuses of home devices according to scene information output from the scene switching control center module so that the home devices comply with scene control target. In a particular embodiment, the scene executing module can be a collection of several function executing modules; or can be a communication interface which is used for outputting control target or control instruction to the controlled devices; or can be a combination of the above. The controlled home devices comprises one or more of devices such as illumination devices, audio devices, air conditioner, electric heater, digital photo frame, computer, television, electric curtain, security system, air purifier, water heater or the like.

The scene alternative module is used for checking and selecting alternative scenes that satisfy conditions, and for transmitting the confirmed alternative scenes to the scene switching control center module. Using the scene alternative module, the user can check or select alternative scenes that satisfy conditions. The scene switching control center module sends scene information, and the scene executing module executes scene switching. In a particular embodiment, the scene alternative module is an optional module of the smart home scene switching system, and can be a display screen, a touch screen or a voice prompting device which is used for providing alternative scenes that satisfy current conditions to the user.

The smart home scene switching system according to the invention relates to control of the following home device systems, such as one or more of illumination system, home audio device system, home theater system, anti-theft alarm system, walkie-talkie and supervision system, electric curtain system, air purifier system, air conditioner system, solar energy and energy-saving system, hot water system or the like.

The above described is a general analysis of the smart home scene switching system. Three preferred embodiments for achieving the objective of the invention will be described below, and the operational principle of the smart home scene switching system according to the invention will explained with reference to a specific implementation structure.

Embodiment 1: Smart Switch Mode

In the smart switch mode, the smart switch comprises an embedded processor for realizing the function of the scene switching control center module;

the function of scene setting module is realized by devices such as computer, mobile terminal or the like in a wired or wireless manner;

the smart switch comprises a timing chip for realizing the function of timing;

the smart switch reads monitored information such as personnel information, light intensity or the like from status sensors and operating status information of home appliances by the way of electrical connection or wireless input so as to realize the function of the event input module;

the smart switch displays icon information of the alternative scenes in real time through a display screen or a touch screen so as to realize the function of the scene alternative module;

the smart switch acquires scene confirmation information through operations on the press key, the switch or the touch screen so as to realize the function of the scene selecting module;

the smart switch realizes the function of the scene executing module by electrical connection, switch or by adjusting the brightness of light.

Embodiment 2: Smart Home Control Terminal Mode

In the smart home control terminal mode, the control terminal comprises an embedded processor for realizing the function of the scene switching control center module;

the smart home control terminal realizes the function of scene setting module by devices such as computer, mobile terminal or the like in a wired or wireless manner or by a display screen or a touch screen;

the smart home control terminal comprises a timing chip for realizing the function of timing;

the smart home control terminal reads monitored information such as personnel information, light intensity, temperature, humidify or the like from status sensors and operating status information of home appliances by the way of wired or wireless communication so as to realize the function of the event input module;

the smart home control terminal displays icon information of the alternative scenes in real time through a display screen or a touch screen located at the smart home control terminal itself or located at the switch so as to realize the function of the scene alternative module;

the smart home control terminal acquires scene confirmation information through operations on the press key, the switch or the touch screen so as to realize the function of the scene selecting module;

the smart home control terminal controls operating statuses of the security system, light, air conditioner, electric heater, electric curtain, computer, television and digital photo frame via electrical connection or wired or wireless communication so as to realize the function of the scene executing module.

Embodiment 3: Mobile Terminal Application Mode

In the mobile terminal application mode, the processor of the mobile terminal is used so as to realize the function of the scene switching control center module;

the mobile terminal application uses its own display screen or touch screen to realize the function of scene setting module;

the mobile terminal application invokes a timing program contained in the mobile terminal so as to realize the timing function;

the mobile terminal application reads monitored information such as personnel information, light intensity, temperature, humidify or the like from status sensors and operating status information of home appliances by the way of wired or wireless communication so as to realize the function of the event input module;

the mobile terminal application displays icon information of the alternative scenes in real time through a display screen or a touch screen so as to realize the function of the scene alternative module;

the mobile terminal application acquires scene confirmation information through an operation of capturing press key or touch screen so as to realize the function of the scene selecting module;

the mobile terminal application controls operating statuses of the security system, light, air conditioner, electric heater, electric curtain, computer, television and digital photo frame via wired or wireless communication so as to realize the function of the scene executing module.

In the control systems of the three above specific embodiments, if a display screen is provided in each of the system, several alternative scenes that are currently provided and arranged in sequence can be dynamically displayed on the display screen for user's selection, which is intuitive and clear. In addition, the user can also control the switch configured in the system or perform a consecutive operation on the press key so as to select and confirm desired scene mode, which is simple to realize and low in cost.

The invention provides a smart home scene switching method and system. In order to make the inventive concept of the invention more clearly understood, the technical solutions of the invention will be explained below with reference to a specific scene switching example.

In the home of a certain user, the smart home scene switching system according to the invention is installed, which is implemented in a smart home control terminal mode: the control terminal comprises an embedded processor which can dynamically calculate several groups of scenes after ordering according to the currently read status parameters and historical record; the user uses press keys of the control terminal to realize selection and confirmation of scenes. Before realizing the smart scene switching function, the user must firstly use the scene setting module of the smart terminal to set some basic parameters. For example, several scene modes can be defined in advance through the control terminal, and scene numbers are defined respectively, e.g., S000: home mode; S001: power saving mode; S002: meeting mode; S003: theater mode; S004: sleeping mode; S005: dinning mode; S006: leaving mode, etc. The user can use the display screen of the smart terminal or a computer, a mobile terminal or the like connected wirelessly to the smart terminal to set the relevant scene information. For example, in the power saving mode, only 50% of the lights are turned on in the living room, and the rest lights are turned off. Further, for example, in the theater mode, only 30% of the illumination lights are turned on, and meanwhile the sound effect is opened, etc. Different geographic locations can have independent scenes, and a plurality of geographic locations can also have identical scenes.

After the setting is completed, the smart terminal acquires personnel information (e.g., person approaching or departing), environment status information such as light intensity, time information, position information, user's operation information or operating status information of home appliances, etc. via electrical connection or wired or wireless communication, and dynamically adjusts a priority ordering of various scenes in the current control terminal. In the present embodiment, the scene configuration information is shown as follows:

when the time is 06:00~09:00, the scene priority ordering is S005, S006, S000, S001 . . . ;

when the time is 17:00~19:00, the scene priority ordering is S000, S001, S005, S003 . . . ;

when the time is 19:00~23:00, the scene priority ordering is S003, S001, S004, S005 . . . ;

when the time is 23:00~06:00, the scene priority ordering is S004, S005, S006, S000 . . . ;

The user performs an operation on the press key of the control terminal and operates the press key with a single click or operates it consecutively, and sequentially selects his own desired scene information. For example, when the user unlocks the door at 17:30 and returns home, the "S000 home mode" can be directly activated by pressing the key for one time with a single click; at this time, the all the lights in the living room are turned on, and all the electric curtains are drawn; if the user is not satisfied with the current scene, the scene can be switched to the next scene (i.e., "S001 power saving mode") in the dynamic priority ordering by pressing the key again, i.e., pressing the key for two times; at this time, 50% of the lights are turned on in the living room, and the electric curtain is only drawn to a half degree; if the user is still not satisfied with the current scene, the scene can be switched to the next scene (e.g., "S005 dinning mode") in the dynamic priority ordering by pressing the key again, i.e., pressing the key for three times; at this time, all the lights in the dinning room are turned on, and only 30% of the lights are turned on in the living room; with the difference in the number of times of pressing the key, the user can sequentially switch the scenes according to the current priority ordering S000→S001→S005→S003 . . . , thus selecting the more appropriate scene. After the user finishes dinning at 19:00, according to the read status information, the priority ordering will be automatically adjusted as follows: S003→S001→S004→S005 . . . , and the user can sequentially select different scene modes through the number of times of pressing the key of the control terminal.

The key pressing operation performed by the user on the control terminal can be used only for scene switching at a certain geographic location, and also can be used for scene switching at a plurality of locations. The user can make the arrangement as actually required for himself. For example, the user can set the operation keys in the living room and the bedroom so that they only control scene switching of their respective positions. When the user operates the press key in the living room, only the several scenes that satisfy the living room scene mode will be sequentially switched according to the priority ordering, based on user's pressing operation; and when the user operates the press key in the bedroom, only the several scenes that satisfy the bedroom scene mode will be sequentially switched according to the priority ordering, based on user's pressing operation.

There are several groups of scene modes, and each scene mode can further comprise a plurality of different scenes. The plurality of different scenes in each scene mode can be also configured to be switched and selected via one operation press key. With a plurality of different press keys, the several groups of scene can be switched and selected respectively. The several groups of scene modes can be distinguished from each other in terms of geographic position or other conditions. The frequency at which a certain scene mode is used by the user or the record of use can be also reserved for the next time calculation of the priority ordering of scenes.

With such a smart scene switching mode, the smart home scene switching method and system according to the invention can greatly simplify user's operations and improve the selection efficiency when the user selects the smart home scene modes.

The above described merely shows preferred embodiments of the invention, and does not limit the invention. For those skilled in the art, the invention can be modified and changed in various ways. Any modification, equivalent substitute, improvement or the like made within the spirit and principle of the invention will fall within the scope of protection of the invention.

The invention claimed is:

1. A smart home scene switching method, said method comprising:
   providing a plurality of scene groups, each scene group having a plurality of scenes;
   dynamically calculating a priority order of the plurality of scenes in each scene group according to status parameters of a current scene and/or a historical record of past scenes;
   an event causing scene change comprising a user's selecting operation on the scene and/or variation of status parameters of the current scene and/or a combined variation of status parameters at different time points; and
   sequentially switching scenes according to the priority order, based on the event and a switching rule between the event and the scene;
   wherein the switching rule between the event and the scene is an authorization table of the event, its corresponding scene group and a scene group corresponding to the event is determined according to the event and the switching rule, and the scenes are switched according to the priority order.

2. The method according to claim 1, wherein:
   the status parameters of the current scene comprise environment status parameters, time information, position information and operating statuses of home appliances.

3. The method according to claim 2, wherein:
   the environment status parameters comprise door latch status, temperature, humidity, personnel information and/or light intensity.

4. The method according to claim 1, wherein:
   the historical record of past scenes comprises the frequency at which the past scenes are used.

5. The method according to claim 1, wherein:
   the status parameters of the current scene comprise environment status parameters, time information, position information and operating statuses of home appliances.

6. The method according to claim 1, wherein:
   the historical record of past scenes comprises a frequency at which the past scenes are used.

7. A smart home scene switching system, comprising:
   a plurality of scene groups, each scene group having a plurality of scenes;
   a scene setting module;
   an event input module; and
   a scene switching control center module;
   wherein the scene setting module is for receiving scene information set by a user and for uploading it to the scene switching control center module, wherein the scene information comprises time information, status information and control target information;
   the event input module is for acquiring status parameters of a current scene, generating an event causing scene change and transmitting it to the scene switching control center module;
   the scene switching control center module is for dynamically calculating a priority order of the plurality of scenes in each scene group according to status parameters of the current scene and/or historical record of past scenes, and for outputting scene information according to the priority order, based on the event causing scene change and a switching rule between the event and the scene; and
   the switching rule between the event and the scene is an authorization table of the event, its corresponding scene group and a scene group corresponding to the event is determined according to the event and the switching rule, and the scenes are switched according to the priority order.

8. The system according to claim 7, further comprising a scene selecting module for confirming scene information sent from the scene switching control center module.

9. The system according to claim 7, further comprising a scene executing module for adjusting operating statuses of home devices according to the scene information sent from the scene switching control center module, so that the home devices fit the target of scene control.

10. The system according to claim 7, further comprising a scene alternative module for checking and selecting alternative scenes that satisfy conditions, and for transmitting the confirmed alternative scenes to the scene switching control center module.

11. The system according to claim 10, wherein the status parameters of the current scene comprise environment status parameters, time information, position information and operating statuses of home appliances.

12. The system according to claim 10, wherein the historical record of past scenes comprises a frequency at which the past scenes are used.

13. The system according to claim 7, wherein the status parameters of the current scene comprise environment status parameters, time information, position information and operating statuses of home appliances.

14. The system according to claim 13, wherein the environment status parameters comprise door latch status, temperature, humidity, personnel information and/or light intensity.

15. The system according to claim 7, wherein the historical record of past scenes comprises a frequency at which the past scenes are used.

* * * * *